United States Patent [19]

Gabbert et al.

[11] Patent Number: 4,617,355

[45] Date of Patent: Oct. 14, 1986

[54] CROSS-LINKED NYLON BLOCK COPOLYMERS

[75] Inventors: James D. Gabbert, Wilbraham, Mass.; Ross M. Hedrick, St. Louis, Mo.

[73] Assignee: DSM RIM Nylon VOF, Maastricht, Netherlands

[21] Appl. No.: 670,188

[22] Filed: Nov. 13, 1984

Related U.S. Application Data

[63] Continuation-in-part of Ser. No. 623,257, Jun. 21, 1984, abandoned, which is a continuation-in-part of Ser. No. 560,714, Dec. 12, 1983, abandoned.

[51] Int. Cl.$^4$ ............... C08L 67/00; C08F 283/04
[52] U.S. Cl. ............... 525/420; 525/408; 525/411; 525/435; 525/437
[58] Field of Search ............... 525/420, 435, 437, 408, 525/411

[56] References Cited

U.S. PATENT DOCUMENTS

| | | | |
|---|---|---|---|
| 3,017,392 | 1/1962 | Butler et al. | 528/315 |
| 3,366,608 | 1/1968 | Lincoln et al. | 528/315 |
| 4,490,520 | 12/1984 | Ogasa et al. | 528/315 |
| 4,501,861 | 2/1985 | Woodbrey | 525/408 |

Primary Examiner—Lewis T. Jacobs
Assistant Examiner—A. L. Carrillo
Attorney, Agent, or Firm—R. Bruce Blance

[57] ABSTRACT

A nylon block copolymer prepared from acyl lactam functionalized materials and lactam monomer and cross-linked by a polyfunctional amine.

42 Claims, No Drawings

CROSS-LINKED NYLON BLOCK COPOLYMERS

CROSS REFERENCE TO RELATED APPLICATION

This Application is a Continuation-in-Part of Application Ser. No. 623,257, filed June 21, 1984, now abandoned, which is a Continuation-in-Part of Application Ser. No. 560,714, filed Dec. 12, 1983, now abandoned.

BACKGROUND OF THE INVENTION

1. Field of the Invention

The present invention relates to the field of high impact nylon materials comprising block copolymers of nylon and elastomer segments. More particularly, the present invention relates to cross-linked nylon block copolymers and processes and compositions useful in preparing the cross-linked nylon block copolymers.

Generally, nylon block copolymers may be alternating blocks of polyamide segments and other segments such as segments of elastomeric polymer residues such as residues of polyethers, polyesters, hydrocarbons or polysiloxanes. These nylon block copolymers are generally prepared by copolymerizing lactam monomer and elastomeric polymers and may either be linear or branched depending upon the structure of the elastomeric polymer used. A more detailed discussion of the structure and method of preparing a particular type of nylon block copolymer can be found in U.S. Pat. No. 4,031,164 issued to Hedrick and Gabbert.

The polyamide segments and segments of elastomeric polymer residues of the nylon block copolymers as defined in the Hedrick and Gabbert patent contribute their respective properties to the final polymer. In order to obtain a higher modulus material, polyamide segments of higher molecular weight and/or of higher weight percent could be employed. Greater tensile elongation and impact properties may be obtained by using higher weight percents of and/or higher molecular weight elastomeric polymers in preparing the nylon block copolymers.

It would be advantageous and an advance in the art to develop other means for varying the properties of nylon block copolymers

SUMMARY OF THE INVENTION

The present invention relates to the cross-linking of nylon block copolymers by the use of polyfunctional amines The cross-linked nylon block copolymers of the present invention are obtained by providing a reaction scheme wherein polyfunctional amines cross-link nylon block copolymers. This may be accomplished, for example, by the reaction between acyl lactam functionalized materials and polyfunctional amines to prepare cross-linked acyl lactam functionalized materials which are concurrently or subsequently reacted with lactam monomer in the presence of a lactam polymerization catalyst to form cross-linked nylon block copolymers. The properties of the resulting nylon block copolymers may be varied depending upon the degree of cross-linking. The present invention is directed at the cross-linked nylon block copolymers, cross-linked acyl lactam functionalized materials from which these nylon block copolymers may be prepared and the processes of preparing these cross-linked acyl lactam functionalized materials and nylon block copolymers.

DESCRIPTION OF THE PREFERRED EMBODIMENTS

Nylon block copolymers are generally comprised of alternating blocks of polyamide segments

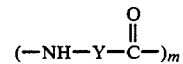

wherein Y is an alkylene group and m is an integer greater than one, and residues of elastomeric polymers such as polyethers, hydrocarbons, polyesters or polysiloxanes or combinations thereof. A more detailed description of a particular type of nylon block copolymer can be found in U.S. Pat. No. 4,031,164 which is incorporated herein by reference.

There are numerous methods of preparing nylon block copolymers. One general procedure involves the use of prepolymerized elastomeric polymers (polymers which provide elastomeric segments in nylon block copolymers) and lactam monomer wherein the elastomeric polymer is prepared so as to have a lactam initiator group from which additional lactam monomer polymerizes to form polyamide segments. The lactam initiator group may be an acyl lactam group which is a known initiator of lactam polymerization.

The use of elastomeric polymers prepared to possess acyl lactam groups for the preparation of nylon block copolymers is disclosed in the copending U.S. applications Ser. Nos. 467,625, now abandoned, and 467,703, now U.S. Pat. No. 4,590,243, which are assigned to the same assignee as the instant application, also incorporated herein by reference. These described acyl lactam functional materials may then be reacted with lactam monomer in the presence of basic lactam polymerization catalyst to form nylon block copolymers.

As discussed above, nylon block copolymers exhibit the properties contributed by the elastomeric polymer residues and polyamide segments.

In accordance with the present invention, it has been determined that by cross-linking nylon block copolymers with polyfunctional amines, the overall properties of the final polymer may be varied even if maintaining the molecular weight and weight percent of the elastomeric polymers constant. In one embodiment, this cross-linking is obtained by providing the reaction between at least one acyl lactam functionalized material and at least one polyfunctional amine and the subsequent or concurrent reaction with lactam monomer in the presence of lactam polymerization catalyst.

For the purpose of the present invention, the term "polyfunctional amine" shall mean an organic compound, such as for example, a polymer, which has been prepared so as to possess at least two primary or secondary amine groups and, more preferably, possessing at least three primary or secondary amine groups. Polyfunctional amines useful in the practice of the present invention may be of varying molecular weight and type of organic compound. It should be noted that polyfunctional amines suitable for the present invention are those of the type which are capable of cross-linking acyl lactam functionalized materials and/or nylon block copolymers. Furthermore, the position of amine functionality may be at the end of the organic compound, pendant from the organic compound, or within the organic compound such as when the amine group is intralinear. The polyfunctional amine must be provided with at least two amine functional groups that are primary or secondary. Tertiary amines would be nonreactive with the acyl lactam functionality of the acyl lactam functionalized material and thus not cross-link nylon block copolymers in accordance with the present invention. However, as it is known by those skilled in the art, typical commercial polyfunctional amine compositions may have a distribution of polyfunctional amines which may have a distribution of primary, secondary and tertiary amines. A composition of this type is useful for practice of the present invention so long as a sufficient amount of polyfunctional amines are provided with at least two and, more preferably, at least three primary or secondary amine groups which will react with the acyl lactam functionality of the acyl lactam functionalized materials and provide for the cross-linking of acyl lactam functionalized materials and ultimately the nylon block copolymer.

As stated above various types and molecular weights of polyfunctional amines are useful for the practice of the present invention so long as they are capable of cross-linking acyl lactam functionalized materials and/or nylon block copolymers. The type of polyfunctional amine used may influence the physical properties of the nylon block copolymer prepared therefrom. Preferred polyfunctional amines include polyether-amines, polyamines, polyester-amines and hydrocarbon-amines. Typical molecular weight ranges for these polyfunctional amines are at least about 60, more preferably from about 500 to about 100,000. As used throughout this discussion of the present invention and the examples that follow, the term "molecular weight" refers to number average molecular weight as determined by procedures well known in the art. More preferred polyfunctional amines are polyoxyalkylene polyamines wherein the alkylene group is $C_2$ to $C_4$, having molecular weights ranging between about 400 and about 5,000. Other preferred polyfunctional amines are hydrocarbon-amines having molecular weights ranging between about 600 and about 100,000. The most preferred polyfunctional amines are polyamines which generally are prepared by the polymerization of alkyleneimines such as ethyleneimine and by polymerization of organic diamines such as alkylene diamines which result in polyamines having intrachain secondary and tertiary amine groups. These preferred polyamines have molecular weights ranging between about 60 to about 50,000. Examples of such polyamines are polyethyleneimines, diethylenetriamine, triethylene tetramine, tetraethylenepentamine and triethylenediamine. Polyetheramines, polyester-amines and hydrocarbon-amines may be prepared from polymers which possess functional groups reactive towards di or polyfunctionalized amine monomers so as to result in the respective polyfunctional amine. They may also be obtained by reductive amination of polyols, by cyanoethylation of polyols followed by hydrogenation or by reaction of 2 equivalents of diisocyanate with each hydroxy of a polyol and reaction with water. Other methods of preparing such polyfunctional amines are within the skill of those in the art.

The use of polyether-amines or other polyamines of glass temperature below 20° C. may have a substantial influence on the tensile elongation and impact properties of the nylon block copolymer prepared therefrom, especially when the polyamine is of a relatively high molecular weight. The effect upon these properties may be to such a degree that the acyl lactam functionalized materials used to prepare the nylon block copolymer may be reduced on a mole for mole basis with the polyamine without affecting the overall properties countributed by the elastomeric polymer residues of the acyl lactam functionalized materials.

For purposes of the present invention the term "acyl lactam functionalized materials" shall mean any elastomeric polymer (i.e. polymer capable of providing elastomeric segments to the nylon block copolymer) such as polyethers, polyesters, hydrocarbons and polysiloxanes which have been prepared so as to possess acyl lactam groups. The term "acyl lactam group" shall mean for the purposes of the present invention the $C_3$ to $C_{14}$ lactam derivative of a carboxylic acid, a sulfonic acid, a phospho- acid, a thiocarboxyl derivative of carboxylic acid, or an equivalent acid. The term "acyl lactam functionality" shall mean the number of acyl lactam groups possessed by a molecule of the acyl lactam functionalized material. These acyl lactam functionalized materials may be prepared by any known means. The preferred acyl lactam groups are derived from carboxylic acid groups. For the purpose of the present invention, elastomeric polymer shall mean a polymer which when co-reacted with lactam monomer provides a nylon block copolymer possessing tensile recovery of at least about 50 percent. For this test, tensile recovery is determined on a dry, as molded sample of polymer elongated 50% of its initial length (l) and held for ten minutes before release of tension. Ten minutes after release, the length ($l_r$) of the sample is measured. The percentage of tensile recovery is $$\frac{1.5 \, l - l_r}{0.51} \times 100.$$

While it is required that the nylon block copolymer be comprised of at least 50 weight percent of the elastomeric polymer in order to determine whether it imparts the tensile recovery set forth above, it should be appreciated that the amount of elastomeric polymer in the nylon block copolymer compositions of the present invention is not limited to at least 50 weight percent since lower and higher amounts in the range of 10 to 90 weight percent also impart improved properties to nylon polymer.

The acyl lactam functionalized material is derived from elastomeric polymers having molecular weight ranging between about 200 and about 15,000, more preferably about 1000 to 10,000 and even more preferably 1000 to 6000. Preferred acyl lactam functionalized materials are those derived from polyethers having molecular weights greater than 1000, preferably greater than 2000 and more preferably between about 4,000 and about 8,000. Other preferred acyl lactam functionalized materials are those derived from hydrocarbons having molecular weights of at least 1,000, and preferably about 2,000 to about 5,000. Other preferred acyl lactam functionalized materials are prepared from polyesterethers or polyester-hydrocarbons, wherein the polyester is prepared from polyethers or hydrocarbons of molecular weights of at least 1000, cross-linked by di- or tri-functional acid halides.

One preferred acyl lactam functionalized material of the present invention has the following general structure:

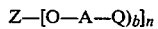

wherein:

Q is a residue of a $C_3$ to $C_{12}$ lactam, preferably e-caprolactam and 2-pyrrolidone, more preferably, 2-pyrrolidone;

Z is an elastomeric polymer segment and, more preferably, a segment of a polyether, a polyester-ether, a polyester-hydrocarbon, a hydrocarbon, or mixtures thereof;

A is selected from the group consisting of

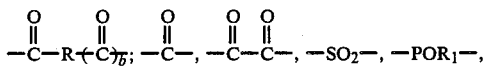

and mixtures thereof, and more preferably,

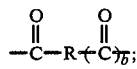

b is an integer equal to 1, 2, or 3;

R is selected from hydrocarbon and polyether groups;

$R_1$ is selected from alkyl, aryl, aralkyl, alkyloxy, aryloxy, aralkyloxy, and halogen groups; and n is an integer greater than 1, preferably greater than 2 and, more preferably, equal to 3.

These preferred acyl lactam functionalized materials are generally prepared by the reaction of hydroxy functionalized polymers, such as polyethers, hydrocarbons, polyesters containing polyether segments or hydrocarbon segments, or polysiloxanes with polyfunctional acid halides providing R groups of molecular weight up to 300 such as terephthaloyl halide or isophthaloyl halide (wherein R is phenylene) in the presence of an acid scavenger, and the subsequent reaction with lactam monomer. It should be noted, however, that those skilled in the art will recognize that these preferred acyl lactam functionalized materials may be prepared by various means. The above referred to "Z" segments have the same molecular weight limitations as discussed above for the elastomeric polymers useful for the preparation of acyl lactam functionalized materials. Suitable polyether Z segments are the various polyalkyleneoxides such as polyethyleneoxides, polypropyleneoxides and poly(tetramethyleneoxides). Examples of suitable polymeric hydrocarbon segments are the various polyalkenes and polyalkadienes and alkadiene copolymers such as polyethylene, polypropylene, and polybutadiene and copolymers of butadiene and acrylonitrile. Examples of suitable polyester segments are those prepared by reacting polyether polyols such as polyoxypropylene polyol or polyoxyethylene polyol with polyfunctional acid halides such as terephthaloyl chloride so as to form a polyesterether or by reacting a polymeric hydrocarbon polyol such as polybutadiene diol with a polyfunctional acid halide such as terephthaloyl chloride so as to form a polyesterhydrocarbon. Examples of suitable polysiloxane segments are silicon polycarbinol and polydimethylsiloxane diols and polyols.

The cross-linked nylon block copolymers of the present invention are prepared under conditions so as to cause the polyfunctional amines to react with the acyl lactam group of the acyl lactam functionalized materials prior to or concurrent with the polymerization of the lactam monomer. This results in cross-linking the acyl lactam functionalized materials which upon the subsequent or concurrent polymerization of lactam monomer results in the cross-linked nylon block copolymers. It should be noted that in accordance with the present invention it is suitable to use one particular type of acyl lactam functionalized material and/or polyfunctional amine in practicing the invention or it is suitable to use mixtures of the above described acyl lactam functionalized materials and/or polyfunctional amines.

The final nylon block copolymer will typically be comprised of at least about 10 percent by weight of the lactam block polymer, preferably between about 10 and 90 weight percent and more preferably about 60 to about 80 weight percent.

The reaction between the acyl lactam functionalized materials and the polyfunctional amines may be carried out as a distinct independent reaction with the lactam monomer and basic lactam polymerization catalyst being added subsequently. This reaction between the acyl lactam functionalized materials and the polyfunctional amines may be carried out by mixing at least one acyl lactam functionalized material and at least one polyfunctional amine together in either an organic solvent or in lactam monomer, such as caprolactam, at temperatures between about 100° to about 150° C. for a reasonable period of time. The lactam monomer and lactam polymerization catalyst, which will be necessary to polymerize the lactam monomer in preparation of nylon block copolymers may be added subsequent to this reaction.

The reaction between acyl lactam functionalized material and the polyfunctional amine may also be conducted in the presence of the lactam monomer and catalyst. If this process is selected, the reaction conditions may be chosen to allow the reaction between the polyfunctional amine and the acyl lactam functionalized material to be preferred over lactam monomer polymerization. This may be accomplished by maintaining the reaction temperature below the optimum temperature for lactam polymerization such as by maintaining the temperature below about 100° C. at the mixing step and then raising it to a temperature above about 100° C. such as in the range of 110° to 150° C. in order to enhance the lactam monomer polymerization. Preferably the reaction conditions are selected to allow the reactions to occur concurrently, for example by raising the temperature rapidly to 130°-150° C. after the reactants are mixed.

The amount of polyfunctional amine used for the practice of the present invention should be sufficient to improve the tensile properties and or the tear strength of the nylon block copolymer. The amount will depend to a large extent on the molecular weight and functionality of the polyamine, lesser amounts being required when the molecular weight or the functionality is high. The polyamine is advantageously present in an amount of at least 0.02 equivalent, preferably at least 0.2 equivalent and even more preferably 0.3 to 0.6 equivalent of amine (primary and secondary) per equivalent of acyllactam.

The resulting linkage between the polyfunctional amine and the acyl lactam group of the acyl lactam functionalized material is believed to be represented as follows:

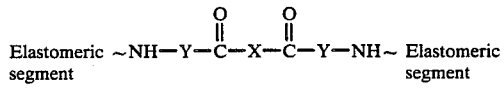

wherein X is the residue of the polyfunctional amine, wherein the linkage is provided by the amine groups of the polyfunctional amine and the carbonyl group of the lactam residue. The polyfunctional amine from which X is derived, as stated above may have the amine groups positioned at the terminal positions of the polymer molecule, pendant from the polymer molecule or incorporated into the polymer as intrapolymer groups.

A representative nylon block copolymer which has been prepared from a preferred acyl lactam functional material cross-linked by a polyfunctional amine has the following general formula:

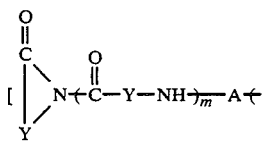
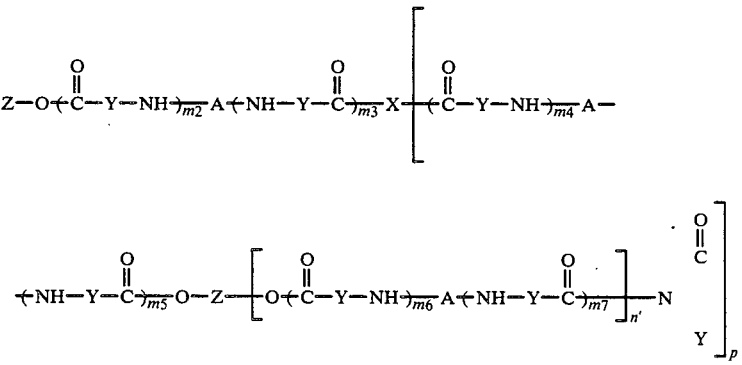

wherein

Z and A are as defined hereinabove.

X is a residue of a polyfunctional amine preferably a polyether amine, a polyester derived from a polyether amine or a polymeric hydrocarbon amine, a polymeric hydrocarbon amine, or a polyamine;

Y is an alkylene or substituted alkylene having from about 3 to about 14 carbon atoms, preferably 3 or 5 carbon atoms and, more preferably, 5 carbon atoms;

p is an integer equal to or greater than 1 and preferably greater than 3;

m, $m_1$, $m_2$, $m_3$, $m_4$, $m_5$, $m_6$, and $m_7$, are each an integer equal to one or more; and n and n' are each an integer equal to one or more, preferably two or more, and more preferably, three or more.

It should be noted from the above cross-linked nylon block copolymer formula that the reaction between the acyl lactam functionalized elastomeric segment and polyfunctional amine would result in an amide linkage (~NH-Y-CO-X-CO-Y-NH) between the functionalized elastomeric segment and the polyfunctional amine.

EXAMPLES 1 AND 2

The following examples demonstrate two processes of cross-linking acyl lactam functionalized elastomeric segments. Example 1 demonstrates the process of the present invention starting with the reaction of polyol and bisimide (or bis acyl lactam) to form the acyl lactam functionalized elastomeric segment which is subsequently reacted with polyfunctional amine and then lactam monomer. Example 2 demonstrates the process of the present invention starting with an acyl lactam functionalized elastomeric segment which is cross-linked by a polyfunctional amine and subsequently reacted with lactam monomer. Two examples, 1' and 2' were prepared by the exact procedure and from the same materials as Examples 1 and 2 minus the polyfunctional amine for comparing the properties between cross-linked nylon block copolymer in accordance with the present invention and a nylon block copolymer absent such cross-linking.

EXAMPLE 1

A 500 milliliter (ml) flask was charged with 117 grams (gms) of an ethylene oxide capped polyoxypropylene triol molecular weight (m.w.) approximately 4,800, 26.3 gms adipyl bis caprolactam, 5 gms caprolactam and 1.5 gms Flectol H (an antioxidant). The mixture was heated and stirred under vacuum at 1 millimeter (mm) at 125° C. for 30 minutes and then cooled to 85° C.

In a second flask, 225 gms caprolactam was dried by heating under vacuum until 25 ml of material distilled off. The caprolactam was then cooled to 75° C. and 15 ml of a 3 molar ethyl magnesium bromide in diethyl ether solution was added. This flask was evacuated to thoroughly degas, and 3.7 gms of a polyoxypropylene diamine (approximate m.w. 230) was mixed in.

The contents of both flasks were simultaneously injected into a previously heated to 130° C. closed Teflon lined two sectional mold. The two mold sections were separated by a ⅛" Teflon spacer. The contents were injected into the mold through a ¼ inch ×6 inch Kenics static mixer using two #5 Zenith gear pumps at 200 revolutions per minute (rpm).

After 5 minutes, the casting was removed from the mold. The resulting nylon block copolymer molding contained 40% polyether.

EXAMPLE 2

An acyl lactam functionalized material was prepared by reacting ethylene oxide capped polyoxypropylene triol (approximate m.w. 4800), terephthaloyl chloride and excess caprolactam in tetrahydrofuran at 40° C. in the presence of triethylamine (acting as the acid scavenger). The molar ratio of triol to terephthaloyl chloride used to prepare this functionalized material was 2:5.

A 500 ml flask was charged with 134 gms of the above described acyl lactam functionalized material and 43 gms caprolactam. The mixture was heated under vacuum at a pot temperature of 140° C. to distill off 25 ml caprolactam and then cooled to 85° C.

In a second flask a 0.23 molar bromomagnesium caprolactam solution was prepared by adding 15 ml of a 3 molar ethyl magnesium bromide in diethyl ether solution to 200 gms dry caprolactam. Then 2.12 ml (2.0 gm) of a polyoxypropylene diamine (approximate m.w. 230) was added. The equivalents of primary and secondary amines of the polyfunctional amine were 30 percent of the acyl lactam group equivalent of the acyl lactam functionalized material. The material of the two flasks were injected into a mold as described above for Example 1. After 5 minutes, the casting was removed from the mold to give a nylon block copolymer containing 40% polyether.

COMPARATIVE EXAMPLES 1' AND 2'

Two comparative examples 1' and 2' were prepared in accordance with the same procedure and using the same materials (minus the polyfunctional amine) as described above for the corresponding Examples 1 and 2.

The nylon block polymer castings prepared in Examples 1 and 2 and comparative Examples 1' and 2' were tested for various properties substantially in accordance with the procedures:

| | | |
|---|---|---|
| Tensile Strength: | ASTM 638 | [units are pounds per square inch (psi) or megapascals (MPa)]. |
| Tear Strength: | ASTM D1004 | [units are pounds-force per linear inch (pli) or newtons per meter (N/m)]. |
| Tensile Modulus: | ASTM D638 | [units are pounds per square inch (psi) or megapascals (MPa)]. |
| Tensile Elongation: | ASTM D638 | [units in %] |

The resultant properties for Examples 1 and 2 and comparative Examples 1' and 2' are listed below in Table I. As is seen from Table I, the properties of the nylon block copolymer were generally improved by the cross-linking. The one property which was adversely affected by cross-linking was flexural modulus. However, for certain applications, this decrease is insignificant.

TABLE I
TENSILE PROPERTIES

| | Strength (PSI) MPa | Elong. % | Re-covery* % | Flexural Modulus (PSI) MPa | Tear Strength (PLI) n/m |
|---|---|---|---|---|---|
| Comparative Example 1' | (3350) 23.098 | 320 | 78 | (10100) 69.639 | (407) 71273.026 |
| Example 1 | (3360) 23.167 | 370 | 78 | (8000) 55.160 | (415) 72673.97 |
| Comparative Example 2' | (3570) 24.615 | 320 | — | (16700) 115.146 | (420) 73549.56 |
| Example 2 | (3720) 25.649 | 330 | 72 | (13400) 92.393 | (450) 78803.1 |

*Tensile recovery was determined after tensile break.

EXAMPLES 3 THROUGH 9

Examples 3 through 9 demonstrate the use of di- and tri- functional amines for cross-linking nylon block copolymers in accordance with the present invention.

A master batch of acyl lactam functionalized material solution was prepared by charging 1800 gms of an acyl lactam functionalized elastomeric segment, prepared as described for Example 2, into a flask along with 18 gms Flectol ODP antioxidant. The mixture was heated while stirring vigorously for 1 hour at 100° C. under 1 mm Hg vacuum to remove any moisture. The mixture was then cooled to 75° C., and separated into 200 gm. portions for preparing Examples 3–9.

A master batch of 0.18 molar caprolactam magnesium bromide in caprolactam (catalyst solution) was prepared by adding 60 ml of a 3-molar ethyl magnesium bromide in diethyl ether solution to 1000 gms dry molten caprolactam followed by thorough degassing under 1 mm Hg vacuum. Polyfunctional amines were added to the catalyst solution in the amounts and type for each of the examples as indicated below in Table II.

TABLE II

| Example No. | Amine Used | Mixture Catalyst Solution/Amine (gm) | | Equiv.[3] Amine (%) |
|---|---|---|---|---|
| | | Catalyst Sol. | Amine | |
| 3 | HMD[1] | 112.9 | 1.54 | 25% |
| 4 | HMD[1] | 137.3 | 2.64 | 33% |
| 5 | HMD[1] | 109.7 | 2.33 | 37.5% |
| 6 | HMD[1] | 103.8 | 2.41 | 40% |
| 7 | TAN[2] | 118.2 | 1.60 | 25% |
| 8 | TAN[2] | 146.6 | 2.48 | 30% |
| 9 | TAN[2] | 163.4 | 2.91 | 32% |

[1]1,6 Hexane Diamine
[2]Triaminononane
[3]Equivalent percent of amine functionality (primary and secondary amine functionality combined) per total acyl lactam functionality calculated for each 200 gm portion of acyl lactam functionalized material.

The functionalized material solution and catalyst solution containing the polyfunctional amine were pumped into a previously heated to 130° C. vertical Teflon-lined two-section mold. The mold sections were held apart by ⅛" Teflon spacers. The solutions were pumped into the mold through a # inch ×6 inch Kenics static mixer by two #5 Zenith gear pumps at 200 rpm.

The pumping ratios were 2.57 ml functionalized material solution to 1 ml catalyst solution. The nylon block copolymer set into a hard resin in 30 or 60 seconds in each example.

Listed below in Table III are the resulting properties obtained for Examples 3–9. These properties were determined as described above for Examples 1 and 2.

TABLE III

| Example No. | Tensile Strength | | Tensile Elongation | Tensile* Recovery |
|---|---|---|---|---|
| | MPa | (PSI) | | |
| 3 | 8.480 | 1230 | 300 | 92 |
| 4 | 8.756 | 1270 | 383 | 86 |
| 5 | 11.859 | 1720 | 407 | 90 |
| 6 | 10.894 | 1580 | 449 | 88 |
| 7 | 7.515 | 1090 | 317 | 88 |
| 8 | 8.136 | 1180 | 472 | 85 |
| 9 | 6.550 | 950 | 364 | 88 |

*Tensile recovery was determined after tensile break.

EXAMPLES 10–16

Examples 10–16 demonstrate the effect upon the properties of a nylon block copolymer cross-linked by amines in accordance with the present invention wherein diamines and triamines are used at differing mole percentages.

Each example was prepared from an acyl lactam functionalized material solution master batch. This master batch was prepared by charging to a 2 liter flask, 1067 grams of functionalized material, as prepared above in Example 2, 158 gms caprolactam, 0.4 gms cupric acetate monohydrate. The mixture was dried by distilling off 25 ml of material under vacuum at 140° C. The dried solution was held at 100° C. under vacuum until used at which time the vacuum was released to nitrogen.

Individual batches (200 gms) of catalyst solution were made for each respective example. Each of these individual catalyst batches were prepared by charging to a 500 ml flask 193 gms caprolactam plus the amine to be used in the amount shown below in Table IV. The catalyst solution was dried by distilling off 25 ml of material under oil pump vacuum at 140° C. The temperature was adjusted to 125° C., and 32 gms of a catalyst concentrate was added and dissolved to each batch. The catalyst concentrate contained 1.05 moles/Kg of caprolactam magnesium bromide in caprolactam. Each of the prepared catalyst solutions contained 0.16 moles/Kg of caprolactam magnesium bromide. The catalyst solutions were held at 100° C. under vacuum until use at which time vacuum was released to nitrogen. Table IV below shows the type and amount of amine used and the mole percent of amines to acyl lactam groups.

TABLE IV

| Example | Amine Used | Equivalent Amine[1] (%) | Gms Amine |
|---|---|---|---|
| 10 | None | 0 | 0 |
| 11 | PEI-6[2] | 30 | 1.17 |
| 12 | PEI-6[2] | 60 | 2.24 |
| 13 | PEI-6[2] | 90 | 3.41 |
| 14 | PEI-6[2] | 150 | 5.66 |
| 15 | PEI-18[3] | 60 | 2.24 |
| 16 | PEI-18[3] | 90 | 3.41 |

[1]Equivalent amine functionality (combined primary and secondary) per acyl lactam functionality of acyl lactam functionalized material assuming a 1:1 mix ratio of the functionalized material solution to catalyst solution.
[2]PEI-6-Poly(ethylene imine) having a molecular weight of 600. Amine groups are distributed as 25% primary, 50% secondary and 25% tertiary.
[3]PEI-18-Poly(ethylene imine) having a molecular weight of 1800. Distribution of amine types same as PEI-6.

The functionalized material solution and catalyst solution prepared above were pumped simultaneously through a ¼ inch Kenics static mixer into a previously heated to 130° C. vertical mold measuring 8"×8"×⅛" by two #5 Zenith gear pumps at 200 rpm. The resulting nylon block copolymer molding contained 40% polyoxypropylene.

The above moldings of Examples 10-16 were tested for the properties listed below in Table V according to the test procedures set forth above for Examples 1 and 2 with the additional testing of flex recovery being conducted as follows:

Flex Recovery—Molding bent 180° around ½" Mandrel for 30 seconds. Relaxed and recovery reading taken after 5 mins. Units in percent (%).

The results of this testing are given below in Table V.

EXAMPLES 17–20

Examples 17 through 20 demonstrate the properties of nylon block copolymers cross-linked with a polyether-triamine in accordance with the present invention and wherein the amount of acyl lactam functionalized material used to prepare the nylon block copolymer was reduced as the amount of polyetheramine used. The effect of the elastomeric properties contributed by the polyether-amine compensated for the lessened amount of acyl lactam functionalized material used to prepare the nylon block copolymer.

The acyl lactam functionalized material was prepared as described above in Example 2. A batch of functionalized material in caprolactam solution was prepared for Examples 17-20, respectively. The respective amounts of functionalized material and caprolactam used for each example solution is shown in Table VI below.

TABLE VI

| Example | Functionalized Material (gm) | Caprolactam[1] (gm) |
|---|---|---|
| 17 | 132 | 43 |
| 18 | 124 | 51 |
| 19 | 131 | 44 |
| 20 | 120 | 55 |

[1]Caprolactam charge includes 25 gms extra for distilling in order to dry the solution. The charge also includes 0.06% by weight of cupric acetate hydrate (antioxidant).

A catalyst solution was prepared for each example in accordance with the procedure set forth above for Examples 10-16. Each solution had a resulting concentration of 0.16 moles of caprolactam magnesium bromide per kg of caprolactam solution. Polyfunctional amines were added to the catalyst solution with the type, amount and resulting equivalency of amine functionality (primary and secondary) per acyl lactam equivalency for each example listed below in Table VII.

TABLE VII

| Ex. | Gms Caprolactam[1] | Amine Used | Equivalency Amine % | Gms. Amine | Gms. Catalyst Concentrate |
|---|---|---|---|---|---|
| 17 | 191 | T-403[2] | 20 | 1.8 | 32 |
| 18 | 185 | T-403[2] | 100 | 8.1 | 32 |
| 19 | 191 | T-3000[3] | 4 | 2.5 | 32 |
| 20 | 176 | T-3000[3] | 30 | 17.2 | 32 |

[1]Caprolactam includes 25 gms extra for distillation.

TABLE V

| No. | Equiv. Amine % | Tensile Strength (PSI) | Tensile Strength MPa | Tensile Elongation % | Tensile Modulus (PSI) | Tensile Modulus MPa | Tear Strength (PLI) | Tear Strength N/m | Flex. Recov. % |
|---|---|---|---|---|---|---|---|---|---|
| 10 | 0 | (4850) | 33.440 | 340 | (54,300) | 374.399 | (650) | 113826.7 | 79 |
| 11 | 30 | (5710) | 39.370 | 400 | (72,400) | 499.198 | (800) | 140094.4 | 73 |
| 12 | 60 | (5870) | 40.474 | 380 | (75,600) | 521.262 | (830) | 145347.94 | 73 |
| 13 | 90 | (5140) | 35.440 | 320 | (67,100) | 462.654 | (770) | 134840.86 | 74 |
| 14 | 150 | (5250) | 36.199 | 330 | (48,100) | 331.649 | (770) | 134840.86 | 73 |
| 15 | 60 | (5650) | 38.956 | 350 | (75,900) | 523.330 | (810) | 141845.58 | 72 |
| 16 | 90 | (5460) | 37.646 | 340 | (70,300) | 484.718 | (780) | 136592.04 | 73 |

The properties of tensile elongation, tensile strength, tensile modulus and tear strength show improvement between the equivalent amine percent of about 30 and about 60 with these properties decreasing after about 60 percent but still being better than those of Example 10. Flex recovery appeared to suffer from cross-linking but for certain applications this would not be detrimental. Overall, the property picture is improved.

[2]Polyoxypropylene triamine, approx. m.w. 400 (Jeffamine" T403)
[3]Polyoxypropylene triamine, approx. m.w. 3000 (Jeffamine" T-3000)

Each of the examples were tested for the properties listed below in Table VIII in accordance with the testing procedures discussed above. The results of this testing are listed below for each example with the properties of Example 10 being repeated for comparison.

TABLE VIII

| Ex. | Amine Eq.-% | Tensile Strength (PSI) | Tensile Strength MPa | Tensile Elongation % | Tensile Modulus (PSI) | Tensile Modulus MPa | Tear Strength (PLI) | Tear Strength N/m | Flex. Recov. % |
|---|---|---|---|---|---|---|---|---|---|
| 10 | 0 | (4850) | 33.441 | 340 | (54,300) | 374.398 | (660) | 115577.88 | 79 |
| 17 | 20 | (5370) | 37.026 | 390 | (73,900) | 509.540 | (780) | 136592.04 | 73 |
| 18 | 100 | (5900) | 40.680 | 460 | (65,100) | 448.864 | (790) | 138343.22 | 74 |
| 19 | 4 | (5960) | 41.094 | 450 | (60,300) | 415.768 | (820) | 143596.76 | 73 |
| 20 | 30 | (4800) | 33.096 | 350 | (56,100) | 386.809 | (780) | 136592.04 | 72 |

It can be seen from the results in Table VIII above that there is a significant improvement in the properties of the nylon block copolymers which were cross-linked. The above results also evidence the significant improvement obtained from polyfunctional amines wherein the amine functionality (primary and secondary) is at least three.

While the preferred embodiments have been described above various substitutions and modifications may be made thereto without departing from the scope of the invention. Accordingly, it is to be understood that the present invention has been described by way of illustration, not limitation.

What is claimed is:

1. A polymer prepared by reaction of at least one acyl lactam functionalized material and at least 0.02 equivalent of at least one polyfunctional amine wherein the acyl lactam functionalized material is derived from an elastomeric polymer having a molecular weight between about 200 and about 15,000, wherein the acyl lactam group is a $C_3$ to $C_{14}$ lactam derivative of a carboxylic acid, a sulfonic acid, a phospho-acid or a thiocarboxyl derivative of a carboxylic acid and wherein the amine has a molecular weight of at least 60 and its polyfunctionality is provided by at least 2 primary or secondary amine groups.

2. The polymer of claim 1 wherein the acyl lactam functionalized material is derived from a polyether, a polyester-ether, a polyester-hydrocarbon, a hydrocarbon or combinations thereof, wherein the acyl lactam group is derived from a carboxylic acid and wherein the polyfunctional amine is a polyetheramine, a polyester-ether amine, a polyester-hydrocarbon amine, a hydrocarbon amine or combinations thereof.

3. The polymer of claim 2 wherein the acyl lactam functionalized material is derived from a polyether or a hydrocarbon having a molecular weight of at least about 1000.

4. The polymer of claim 2 wherein the polyfunctional amine has a molecular weight in the range of about 60 to about 50,000.

5. The polymer of claim 2 wherein the polyfunctional amine is a polyether-amine having a molecular weight in the range of about 400 to about 5000.

6. The polymer of claim 2 wherein at least 0.2 equivalent of polyfunctional amine is reacted with acyl lactam functionalized material.

7. The polymer of claim 2 wherein 0.3 to 0.6 equivalent of polyfunctional amine is reacted with acyl lactam functionalized material.

8. The polymer of claim 2 wherein the acyl lactam functionalized material is represented by the general formula $Z[O—A—Q]_b$ wherein:
Z is a residue of an elastomeric polymer;
A is selected from the group consisting of

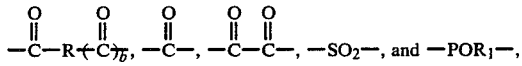

wherein:
b is an integer equal to 1, 2 or 3;
R is selected from hydrocarbon and polyether groups;
$R_1$ is selected from alkyl, aryl, aralkyl, alkyloxy, aryloxy, and aralkyloxy groups;
n is an integer greater than 1; and
Q is the residue of epsilon-caprolactam, or 2-pyrrolidinone.

9. The polymer of claim 8 wherein the Z segment is a polyether, a hydrocarbon, a polyester-ether, or a polyester-hydrocarbon of molecular weight at least 1000 and A is

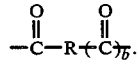

10. The polymer of claim 9 wherein, the polyfunctional amine has a molecular weight in the range of about 60 to about 50,000.

11. The polymer of claim 10 wherein R is 1,3- or 1,4-phenylene and the polyfunctional amine is a polyether-amine having a molecular weight in the range of about 400 to about 5000.

12. The polymer of claim 9 wherein at least 0.2 equivalent of polyfunctional amine is reacted with acyl lactam functionalized material.

13. The polymer of claim 9 wherein 0.3 to 0.6 equivalent of polyfunctional amine is reacted with acyl lactam functionalized material.

14. A nylon block copolymer comprising blocks of the polymer of claim 1.

15. A nylon block copolymer comprising blocks of the polymer of claim 2.

16. A nylon-6 block copolymer comprising blocks of the polymer of claim 8.

17. A nylon-6 block copolymer comprising blocks of the polymer of claim 9.

18. A nylon-6 block copolymer comprising blocks of the polymer of claim 11.

19. A nylon-6 block copolymer comprising blocks of the polymer of claim 12.

20. A nylon-6 block copolymer comprising blocks of the polymer of claim 13.

21. A nylon block copolymer prepared by reaction of at least one $C_3$ to $C_{14}$ lactam, an acyl lactam functionalized material and at least one polyfunctional amine in an amount of at least 0.02 equivalent per equivalent of the acyl lactam functionalized material in the presence of a lactam polymerization catalyst, wherein the weight ratio of $C_3$ to $C_{14}$ lactam to acyllactam functionalized material and polyfunctional amine is in the range of 9:1 to 1:9, wherein the acyl lactam functionalized material is derived from an elastomeric polymer having a molecular weight between about 200 and about 15,000, wherein the acyl lactam group is a $C_3$ to $C_{14}$ lactam derivative of a carboxylic acid, a sulfonic acid, a phospho-acid or a thiocarboxyl derivative of a carboxylic acid and wherein the amine has a molecular weight of at least 60 and its polyfunctionality is provided by at least 2 primary or secondary amine groups.

22. The nylon block copolymer of claim 21 wherein the acyl lactam functionalized material is derived from a polyether, a polyester-ether, a polyester-hydrocarbon, a hydrocarbon or combinations thereof, wherein the acyl lactam group is derived from a carboxylic acid and wherein the polyfunctional amine is a polyetheramine, a polyester-ether amine, a polyester-hydrocarbon amine, a hydrocarbon amine or combinations thereof.

23. The nylon block copolymer of claim 22 wherein the acyl lactam functionalized material is derived from a polyether a hydrocarbon having a molecular weight of at least about 1000.

24. The nylon block copolymer of claim 22 wherein the polyfunctional amine has a molecular weight in the range of about 60 to about 50,000.

25. The nylon block copolymer of claim 22 wherein the polyfunctional amine is a polyether-amine having a molecular weight in the range of about 400 to about 5000.

26. The nylon block copolymer of claim 22 wherein the amount of polyfunctional amine is at least 0.2 equivalent of the acyl lactam functionalized material.

27. The nylon block copolymer of claim 22 wherein the amount of polyfunctional amine is in the range of 0.3 to 0.6 equivalent of acyl lactam functionalized material.

28. The nylon block copolymer of claim 2 wherein the acyl lactam functionalized material is represented by the general formula $Z[O-A-Q)_b]$ wherein:

Z is a residue of an elastomeric polymer;
A is selected from the group consisting of

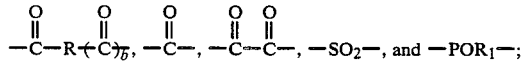

wherein:
b is an integer equal to 1, 2 or 3;
R is selected from hydrocarbon or polyether groups;
$R_2$ is selected from alkyl, aryl, aralkyl, alkyloxy, aryloxy, or aralkyloxy groups;
n is an integer greater than 1; and
Q is the residue of epsilon-caprolactam, or 2-pyrrolidinone.

29. The nylon block copolymer of claim 8 wherein the Z segment is a polyether, a hydrocarbon, a polyester-ether or a polyester-hydrocarbon of molecular weight at least 1000 and A is

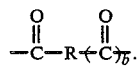

30. The nylon block copolymer of claim 29 wherein the polyfunctional amine has a molecular weight in the range of about 60 to about 50,000.

31. The nylon block copolymer of claim 29 R is 1,3- or 1,4- phenylene and the polyfunctional amine is a polyether-amine having a molecular weight in the range of about 400 to about 5000.

32. The nylon block copolymer of claim 29 wherein at least 0.2 equivalent of polyfunctional amine is reacted with acyl lactam functionalized material.

33. The nylon block copolymer of claim 29 wherein 0.3 to 0.6 equivalent of polyfunctional amine is reacted with acyl lactam functionalized material.

34. A process of preparing a nylon block copolymer which comprises mixing a $C_3$ to $C_{14}$ lactam, an acyl lactam functionalized material, at least one polyfunctional amine in an amount of at least 0.02 equivalent per equivalent of the acyl lactam functionalized material and a lactam polymerization catalyst and subjecting the mix to polymerization conditions, wherein the weight ratio of $C_3$ to $C_{14}$ lactam to acyllactam functionalized material and polyfunctional amine is in the range of 9:1 to 1:9, wherein the acyl lactam functionalized material is derived from an elastomeric polymer having a molecular weight between about 200 and about 15,000, wherein the acyl lactam group is a $C_3$ to $C_{14}$ lactam derivative of a carboxylic acid, a sulfonic acid, a phospho-acid or a thiocarboxyl derivative of a carboxylic acid and wherein the amine has a molecular weight of at least 60 and its polyfunctionality is provided by at least 2 primary or secondary amine groups.

35. The process of claim 34 wherein the acyl lactam functionalized material is derived from a polyether, a polyester-ether, a polyester-hydrocarbon, a hydrocarbon or combinations thereof, wherein the acyl lactam group is derived from a carboxylic acid and wherein the polyfunctional amine is a polyetheramine, a polyester-ether amine, a polyester-hydrocarbon amine, a hydrocarbon amine or combinations thereof.

36. The process of claim 35 wherein wherein the acyl lactam functionalized material is represented by the general formula $Z[O-A-Q)_b]$ wherein:

Z is a residue of an elastomeric polymer;
A is selected from the group consisting of

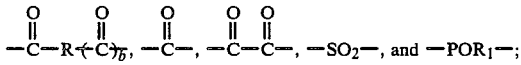

wherein:
b is an integer equal to 1, 2 or 3;
R is selected from hydrocarbon or polyether groups;
$R_1$ is selected from alkyl, aryl, aralkyl, alkyloxy, aryloxy, or aralkyloxy groups;
n is an integer greater than 1; and
Q is the residue of epsilon-caprolactam, or 2-pyrrolidinone.

37. The process of claim 36 wherein the Z segment is a polyether, a hydrocarbon, a polyester-ether or a polyester-hydrocarbon of molecular weight at least 1000 and A is

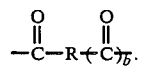

38. The process of claim 36 wherein the polyfunctional amine has a molecular weight in the range of about 60 to about 50,000.

39. The process of claim 37 wherein R is 1,3 or 1,4- phenylene and the polyfunctional amine is a polyetheramine having a molecular weight in the range of about 400 to about 5000.

40. The process of claim 36 wherein at least 0.2 equivalent of polyfunctional amine is reacted with acyl lactam functionalized material.

41. The process of claim 36 wherein 0.3 to 0.6 equivalent of polyfunctional amine is reacted with acyl lactam functionalized material.

42. The process of claim 36 wherein the mixing step is carried out at a temperature below about 110° C. and the polymerization step is carried out at a temperature in the range of about 110° to 150° C.

* * * * *